United States Patent [19]

Chattha

[11] 4,196,270

[45] Apr. 1, 1980

[54] HIGH SOLIDS COATING COMPOSITION ADAPTED FOR USE AS AUTOMOTIVE TOPCOAT-#5

[75] Inventor: Mohinder S. Chattha, Livonia, Mich.

[73] Assignee: Ford Motor Company, Dearborn, Mich.

[21] Appl. No.: 945,039

[22] Filed: Sep. 22, 1978

Related U.S. Application Data

[63] Continuation-in-part of Ser. No. 864,965, Dec. 27, 1977, abandoned.

[51] Int. Cl.$^2$ ............................................. C08L 63/00
[52] U.S. Cl. .................................. 525/110; 525/938; 525/511; 525/514; 260/37 EP; 260/39 P
[58] Field of Search ........................................ 260/834

[56] References Cited

U.S. PATENT DOCUMENTS

| | | | |
|---|---|---|---|
| 2,528,359 | 10/1950 | Greenlee | 260/834 |
| 2,528,360 | 10/1950 | Greenlee | 260/834 |
| 2,541,027 | 2/1951 | Bradley | 260/2 EC |
| 2,732,367 | 1/1956 | Shokal | 260/834 |
| 2,849,418 | 8/1958 | Fang | 260/836 |
| 3,133,838 | 5/1964 | Higgins | 260/837 R |
| 3,198,850 | 8/1965 | Levantin | 260/837 R |
| 3,651,169 | 5/1972 | Davis | 260/834 |
| 3,960,979 | 6/1976 | Khanna | 260/834 |
| 4,027,066 | 5/1977 | Victorius | 260/834 |
| 4,055,607 | 10/1977 | Sullivan | 260/834 |

Primary Examiner—Paul Lieberman
Attorney, Agent, or Firm—Roger L. May; Olin B. Johnson

[57] ABSTRACT

A fast curing, high solids coating composition that is adapted for use as an automotive topcoat and which upon curing forms a hard, glossy, durable coating exhibiting excellent resistance to solvents and water. The coating composition contains greater than about 60 percent by weight of nonvolatile solids and, exclusive of pigments, solvents and other nonreactive components, consists essentially of:

(A) a polyepoxide resin having a number average molecular weight ($\overline{M}_n$) of between about 140 and about 3,000;

(B) a reactive catalyst comprising at least one hydroxy functional organophosphate ester selected from certain mono- and diesters of phosphoric acid;

(C) an amino resin crosslinking agent; and (D) optionally, a hydroxy functional additive.

The hydroxy functional organophosphate ester is included in the composition in an amount sufficient to provide between about 0.67 and about 1.4 equivalents of acid functionality for each equivalent of epoxy functionality in the polyepoxide resin and the amine-aldehyde crosslinking agent is included in the composition in an amount sufficient to provide at least about 0.4 equivalents of nitrogen crosslinking functionality for each equivalent of hydroxy functionality included in the composition.

16 Claims, No Drawings

HIGH SOLIDS COATING COMPOSITION ADAPTED FOR USE AS AUTOMOTIVE TOPCOAT-#5

This application is a continuation-in-part of Ser. No. 864,965 filed Dec. 27, 1977 and now abandoned.

BACKGROUND OF THE INVENTION

This invention relates to a fast curing, high solids, thermosetting coating composition. More particularly, the invention relates to a polymeric, high solids, fast curing coating composition adapted to provide an automotive topcoat which demonstrates hardness, high gloss, outstanding durability and excellent resistance to solvents and water. Still more particularly, this invention relates to a fast curing, high solids, thermosetting coating composition adapted to be used as an automotive topcoat wherein the topcoat includes metallic flake as a pigment.

Because of increasingly strict solvent emissions regulations in recent years, low solvent emission paints have become very desirable. A number of high solids paint compositions have been proposed to meet these low solvent emission requirements. However, many of these compositions are deficient because of difficulty in application, slow curing rates, lack of flexibility, poor durability, and low solvent and water resistance. Many of the proposed compositions have been particularly deficient as automotive topcoats, particularly when the topcoat is to include metallic flake as a pigment.

The deficiency in compositions including metallic flake results from undesired reorientation of the metallic flake during application and curing of the coating. the flake reorientation results primarily because of the very low viscosity resins used in the paint compositions to accommodate high solids. The low viscosity is not sufficient to immobilize the flakes which tend to redistribute themselves to show "reverse flop" and nonuniform distribution.

The coating compositions of this invention combine the above discussed desired properties and low application viscosity with rapid cure so as to overcome deficiencies of previously proposed high solids materials and thereby achieve a high solids coating composition particularly adapted for automotive topcoats and still more particularly adapted for automotive topcoats including metallic flake as a pigment.

SUMMARY OF THE INVENTION

The thermosetting coating composition of this invention contains greater than about 60 percent by weight of nonvolatile solids, preferably greater than about 70 percent by weight, and is capable of curing rapidly at a low temperature. The composition, exclusive of pigments, solvents and other nonreactive components, consists essentially of:

(A) a polyepoxide resin having a number average molecular weight ($\overline{M}_n$) of between about 140 and about 3,000;

(B) a reactive catalyst comprising at least one organophosphate ester having the formula

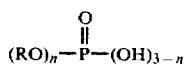

$$(RO)_n-\overset{\overset{O}{\|}}{P}-(OH)_{3-n}$$

wherein n=1 to 2 and R is selected from the group consisting of mono- or dihydroxy alkyl, cycloalkyl or aryl radicals;

(C) an amine-aldehyde crosslinking agent; and (D) up to about 45 weight percent based on the total weight of (A), (B), (C) and (D) of a hydroxy functional resin having a number average molecular weight ($\overline{M}_n$) of between about 150 and about 6000.

The organophosphate ester is included in the composition in an amount sufficient to provide between about 0.67 and about 1.4 equivalents, preferably between about 0.8 and about 1 equivalents, of acid functionality for each equivalent of epoxy functionality on the polyepoxide resin. The amino resin crosslinking agent is included in the composition in an amount sufficient to provide at least about 0.4 equivalents, preferably between about 0.6 and about 2.1 equivalents, of nitrogen crosslinking functionality for each equivalent of hydroxy functionality included in the composition either as (i) an organic hydroxyl group on said organophosphate ester, (ii) a hydroxyl group on said hydroxyl funtional resin, or (iii) as a result of esterification of the epoxy functionality of said polyepoxide resin during cure of the composition. In addition, the high solids coating composition of the invention may include additives such as catalysts, antioxidants, U.V. absorbers, flow control or wetting agents, antistatic agents, pigments, plasticizers, solvents, etc.

PRIOR ART

U.S. Pat. Nos. 3,960,979 and 4,018,848 to Khanna teach high solids coating compositions adapted for use as a can coating material. The compositions consist essentially of (i) aromatic epoxide compositions having two or more epoxy groups on an epoxy resin which has a molecular weight not exceeding 2500; (ii) an amino crosslinking agent; (iii) an inorganic or organic monomeric or polymeric acid which acts as a reactive catalyst; and (iv) a flexiblizing polyol.

The compositions of Khanna have the advantage of quick reaction and low application viscosity, but lack durability and, therefore, do not weather well. As such, the compositions of Khanna are not desirable for use as automotive topcoats. The Khanna patents describe the compositions as a low cure system. However, when considering the specific teachings of the patents one finds that the composition includes an excess of epoxide resin apparently with the purpose of "killing off" excess catalyst after completion of the curing reaction. Excess epoxy resin in the composition remains uncured at the low temperature bake range of the baking temperatures disclosed, not giving a complete cure and desirable hardness, durability or solvent resistance. If heated to higher temperatures, as called for in the examples, the excess epoxy does react with excess hydroxy functionality to give ether linkages. These ether linkages so obtained have a deleterious effect on durability and make the materials paticularly unsuitable for use as an automotive topcoat. Also, the necessary high bake temperatures to achieve the utilization of this excess epoxy makes the composition undesirable from an energy point of view. Still further, because the epoxy/catalyst reaction occurs in early stages of the cure, thus "killing off" the catalyst, the melamine hydroxy curing reaction must proceed substantially without benefit of catalysis. The curing reaction thus proceeds slowly and requires the higher temperatures of the Khanna examples.

DETAILED DESCRIPTION OF THE INVENTION

The high solids coating compositions of this invention overcome disadvantages of prior art high solids compositions, including those of Khanna, to provide a system which is particularly suitable for those applications requiring high gloss, hardness, durability, and high solvent and water resistance as well as a fast cure rate at low temperatures, e.g., between about 75° C. and about 150° C., preferably between about 110° C. and about 130° C. The desirable characteristics of the coating compositions of this invention result from the carefully controlled admixture of the particular components, including a hydroxy functional organophosphate ester, to achieve substantially complete utilization of reactant functionality and a resultant highly crosslinked coating in a fast and efficient manner.

Each of the components of the high solids coating compositions, the amounts of each of the components required to achieve the desired results of the invention and a method for applying the composition are described hereinafter in greater detail.

Polyepoxide Resin

A principal material in the high solids coating compositions of this invention is a polyepoxide resin having a number average molecular weight ($\overline{M}_n$) of between about 140 and about 3,000, preferably between about 300 and about 2,000.

The term polyepoxide resin as used herein means expoxide compounds or polymers containing 2 or more epoxide groups.

Polyepoxide resins useful in the invention are preferably selected from aliphatic, cycloaliphatic and aromatic polyepoxides falling within the stated molecular weight range. Such polyepoxides are well known compositions and any of these may be employed in the coatings of the invention. Among the many suitable types of polyepoxides are those disclosed by U.S. Pat. Nos.: 3,404,018; 2,528,359; 2,528,360; 3,198,850; 3,960,979; and 4,018,848.

U.S. Pat. No. 3,404,018 discloses several particularly suitable types of polyepoxides including: (1) polyglycidyl ethers of polyhydric alcohols and polyhydric phenols; (2) epoxidized esters of polyethylenically unsaturated monocarboxylic acids; (3) glycidyl esters of polybasic acids; (4) epoxidized esters of unsaturated monohydric alcohols and polycarboxyl acids; and (5) epoxidized polymers and copolymers of diolefins. Many polyepoxides other than those recited in this or other referenced patent will be apparent to those skilled in the art.

Organophosphate Ester

A second essential component of the high solids coatings of this invention is a reactive catalyst which comprises a novel hydroxy functional organophosphate ester which is present in the composition as a mono- or diester or as a mixture of such mono- and diesters. The hydroxy functional organophosphate esters useful in the compositions of the invention are those having the formula:

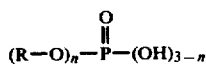

wherein n=1 to 2 and R is selected from the group consisting of mono or dihydroxy alkyl, cycloalkyl, or aryl radicals. Preferably, the hydroxy bearing alkyl, cycloalkyl, or aryl radical contains 3 to 10 carbon atoms.

Among the numerous suitable mono- or dihydroxy functional radicals are: 2-ethyl-3-hydroxyethyl; 4-methylol-cyclohexylmethyl; 2,2 diethyl-3-hydroxypropyl; 8-hydroxyoctyl; 6-hydroxyhexyl; 2,2 dimethyl-3-hydroxypropyl; 2-ethyl-2-methyl-3-hydroxypropyl; 7 hydroxyheptyl; 5-hydroxypentyl; 4-methylolbenzyl; 3-hydroxyphenyl; 2,3 dihydroxypropyl; 5,6 dihydroxyhexyl; 2-(3-hydroxycyclohexyl)-2-hydroxyethyl; and 2-(3-hydroxypentyl)-2-hydroxyethyl.

The above radicals are intended to be only exemplary and numerous other radicals falling within the defined scope of the the organophosphate esters useful in the compositions of invention will be apparent to those skilled in the art. Among the most preferred radicals are mono- or dihydroxy functional alkyl radicals containing 3 to 10 carbon atoms.

A preferred method for preparing the hydroxyfunctional organophosphate esters useful in the compositions of the invention is by an esterification reaction between an excess of an alkyl, cycloalkyl or aryl diol or triol and phosphorus pentoxide. When a triol is used as a reactant, preferably at least one of the hydroxyl groups should be secondary. The reaction between the diol or triol and the phosphorus pentoxide is generally carried out by adding phosphorus pentoxide portionwise to an excess of diol or triol in a liquid state or in solution in a suitable solvent.

Suitable solvents include, but are not limited to, butyl acetate, methyl ethyl ketone, methyl amyl ketone, toluene, xylene, etc.

A preferred temperature for carrying out the reaction is between about 50° C. and about 60° C. Due to the multiple hydroxy functionality of the diol or triol reactant, minor amounts of polymeric acid phosphate as well as certain cyclophosphates are also generated during the synthesis. These polymeric and cyclic materials also serve as a reactive catalyst and, therefore, need not be separated from the hydroxyphosphate esters described above. In fact, it has been found advantageous in preferred embodiments of the invention to employ all reaction products, i.e., the hydroxyfunctional organophosphate esters and the minor amount of polymeric acid phosphate, cyclophosphates, as well as excess diol or triol in the coating compositions. The excess diol or triol serves in those compositions as the optional hydroxy functional additive.

Reactive catalysts prepared by the above preferred method will generally include about a 1 to 1 ratio of the mono- and diester organophosphate.

Still another preferred method of preparing the hydroxy functional organophosphate esters useful in compositions of the invention is by an esterification reaction between phosphoric acid and an alkyl, cycloalkyl or aryl monepoxide. This reaction is carried out by: adding between about 1 and about 2 moles, preferably between about 1 and about 1.5 moles of the monoepoxy material to 1 mole of phosphoric acid or its solution in a suitable solvent, as above. During the esterification reaction which occurs, a hydroxyl group is formed. If a dihydroxy radical is desired in the organophosphate ester, a monoepoxide bearing hydroxy functionality may be used as a reactant. Preferred monoepoxide materials useful in this method are well known monoepoxides selected from monoepoxy ethers, monoepoxy esters and alkylene oxides. Exemplary of preferred monoepoxides for use in this esterification reaction are: propylene oxide, butylene oxide, cyclohexene oxide, styrene oxide, n-butyl glycidyl ether, ethyl glycidyl ether, n-butyl epoxy stearate and glycidyl acetate.

As will be understood by those skilled in the art, the proportion of monoester and diester formed by the reaction will vary with the selected molar ratio of the monoepoxide and the phosphoric acid. When 1 mole of monoepoxide is used per mole of phosphoric acid primarily monoester is formed while a molar ratio of 2 to 1 results in primarily diester. A molar ratio of 1.5 to 1 will result in an approximately 1 to 1 mixture of mono- and diesters. In all cases a minor amount of the triester will be formed. While the triester obviously will not serve as a reactive catalyst it will crosslink with the amino crosslinking agent of the composition and, thus, may be safely included.

The hydroxy functional organophosphate ester component of the high solids coating composition of the invention is a reactive catalyst which allows the composition to cure rapidly at a low temperature. The acid functionality of the mono- or diester or mixture of such esters reacts with the epoxy functionality of the bifunctional copolymer to form an ester and a hydroxyl group. This hydroxyl group, as well as the organic hydroxyl groups on the hydroxy functional organophosphate ester, and any optional hydroxyl groups included in the composition in the form of hydroxy functional additive including excess polyol present from the synthesis of the hydroxy functional organophosphate ester, crosslinks with the amino resin crosslinking agent. It is critical to achieving the desired results of the high solids coating compositions of this invention, i.e., in making them suitable for use as automotive topcoats, that the amount of the hydroxy functional organophosphate ester be sufficient to convert substantially all of the epoxy functionality on polyepoxide resin to the desired hydroxy functionality by esterification reaction. Therefore, the organophosphate ester is included in the composition in an amount sufficient to provide between about 0.67 and about 1.4 equivalents, preferably between about 0.8 and about 1 equivalents, of acid functionality for each equivalent of epoxy functionality on the polyepoxide resin. As will be noted from the equivalent amounts of epoxy and organophosphate acid ester funtionality stated above, the acid functionality need not be in stoichiometric amounts to the epoxy functionality. This is because of the fact that during curing of the high solids coating composition, residual water present in the composition hydrolyzes some of the esterified product back to acid and this hydrolyzed product then, in turn, reacts with additional epoxy functionality.

Amino Crosslinking Agent

A third essential component of the high solids paint compositions of this invention is an amine-aldehyde crosslinking agent. Amine-aldehyde crosslinking agents suitable for crosslinking hydroxy functional bearing materials are well known in the art. Typically, these crosslinking materials are products of reactions of melamine, or urea with formaldehyde and various alcohols containing up to and including 4 carbon atoms. Preferably, the amino-aldehyde crosslinking agents useful in this invention are selected from condensation products of formaldehyde with melamine, substituted melamine, urea, benzoguanamine or substituted benzoguanamine. Preferred members of this class are methylated melamine-formaldehyde resins such as hexamethoxymethylmelamine. These liquid crosslinking agents have substantially 100% nonvolatile content as measured by the foil method at 45° C. for 45 minutes. For the purposes of the invention it should be recognized that it is important not to introduce extraneous diluents that would lower the final solids content of the coating.

Particularly preferred crosslinking agents are sold by American Cyanamid under the trademark "Cymel". In particular, Cymel 301, Cymel 303 and Cymel 1156, which are alkylated melamine-formaldehyde resins, are useful in the compositions of the invention by reacting with hydroxy functionality included in the composition (i) as an organic hydroxyl group on the hydroxy functional organophosphate ester, (ii) as hydroxy functionality on the optional hydroxy functional additive, or (iii) as a result of esterification of the pendant epoxy functionality on the bifunctional copolymer.

In order to achieve the outstanding properties which make these coating compositions particularly useful as automotive topcoat materials, it is essential that the amount of amine-aldehyde crosslinking agent be sufficient to substantially completely crosslink the hydroxy functionality in the coating composition. Therefore, the amine-aldehyde crosslinking agent should be included in the composition in an amount sufficient to provide at least about 0.4 equivalents, preferably between about 0.6 and about 2.1 equivalents, of nitrogen crosslinking functionality for each equivalent of hydroxy functionality included in the composition as discussed above.

Optional Hydroxy Functional Additive

Additional hydroxy functionality other than that achieved by esterification of epoxy functionality of the polyepoxide resin may be achieved by adding a hydroxy functional additive in amounts up to about 45 weight percent based on the total of the three above discussed components and the hydroxy functional additive itself. Such a material serves to provide additional hydroxy functionality so as to provide a more intimate crosslinked structure in the final cured product. The hydroxy functional additives useful in the composition are preferably selected from various polyols having a number average molecular weight ($\overline{M}_n$) of between about 150 and about 6000, preferably between about 400 and about 2500. As used herein the term polyol means a compound having two or more hydroxyl groups.

The polyols useful for the invention preferably are selected from the group consisting of: (i) hydroxy functional polyesters; (ii) hydroxy functional polyethers; (iii) hydroxy functional oligoesters, (iv) monomeric polyols, (v) hydroxy functional copolymers produced by free radical polymerization of monoethylenic unsaturated monomers, one of which bears hydroxy functionality and which is included in the copolymer in an amount ranging from about 2.5 to about 30 weight percent of the copolymer and (vi) mixtures of (i)–(v).

The hydroxy functional polyesters useful in the invention are preferably fully saturated products prepared from aliphatic diabasic acids containing 2–20 carbon atoms, such as succinic acid, glutaric acid, adipic acid, azelaic acid, etc., and short chain glycols of up to and including 21 carbon atoms, such as ethylene glycol, 1,2-propylene glycol, 1,3-propylene glycol, 1,2-butylene glycol, 1,3-butylene glycol, 1,4-butylene glycol, neopentyl glycol, 1,4-cyclohexane dimethylol, 1,6-hexamethylene glycol and 2-ethyl-2-methyl-1,3 propane diol. The molecular weight of these materials ranges from about 200 to about 2500 and the hydroxyl number ranges from about 30 to about 230. The hydroxyl number is defined as the number of milligrams of potassium hydroxide needed for each gram of sample to neutralize the acetic acid generated during the reaction between the polyol and excess acetic anhydride. The polyester polyols utilized in the invention are low melting, soft waxy solids which are easily maintained in the molten state.

Among preferred polyesters are products derived from the esterification of ethylene glycol and 1,4 butane diol with adipic acid, ethylene glycol and 1,2 propylene glycol with adipic acid, azelaic acid and sebacic acid copolyester diols, and mixtures thereof.

Among useful polyether diols are polytetramethylene ether glycol, polyethylene glycol, polypropylene glycol and the like.

The hydroxy functional oligoesters useful as hydroxy functional additives in the compositions of the invention are oligoesters preferably having a molecular weight of between about 150 and about 3000. Such oligoesters may be selected from the group consisting of: (i) oligoesters prepared by reacting a dicarboxylic acid with a monoepoxide such as an alkylene oxide; (ii) oligoesters prepared by reacting a polyepoxide with a monocarboxylic acid; and (iii) oligoesters prepared by reacting a hydroxy functional monocarboxylic acid with either a mono- or polyepoxide.

The oligoester prepared by reacting a dicarboxylic acid with an alkylene oxide is a low molecular weight adduct which has a narrow molecular weight distribution when compared to similar compositions made by normal polyester manufacturing techniques. The adduct is prepared by reacting a dibasic carboxylic acid with alkylene oxides, preferably ethylene oxide or propylene oxide, in the presence of a catalyst. Preferred dicarboxylic acids are $C_6$–$C_{12}$ aliphatic acids such as adipic acid, azelaic acid, sebacic acid or dodecane dicarboxylic acid. Mixtures of these acids or mixtures of the aliphatic dicarboxylic acids also yield suitable hydroxy functional oligoesters.

The preparation of oligoesters from monocarboxylic acids and polyepoxides is well known and is described, for example, in U.S. Pat. Nos. 2,456,408 and 2,653,141. Numerous hydroxy functional oligoesters within this general category will be apparent to those skilled in the art.

The third type of hydroxy functional oligoesters, i.e., those prepared by reaction of a hydroxy functional monocarboxylic acid with an epoxide is described in U.S. Pat. No. 3,404,018. While the epoxides employed in accordance with the teachings of that patent are polyepoxides, oligoesters may be prepared in a similar manner to that described therein by employing a monoepoxide, such as an alkylene oxide, and a hydroxy functional monocarboxylic acid as described therein. Numerous monoepoxide materials suitable for this purpose will be apparent to those skilled in the art.

Among the numerous monomeric polyols which may be employed as the hydroxy functional additive are the various short chain glycols of up to and including 21 carbon atoms which are useful in preparing the hydroxy functional polyesters discussed above. Other conventional polyhydric alcohols such as glycerols and sugar alcohols are also among the numerous monomeric polyols which will be apparent to those skilled in the art. Triol which may be used in the synthesis of the hydroxy functional organophosphate ester may be employed as all or part of the monomeric polyol in the composition of the invention.

The hydroxyl bearing copolymer useful as the hydroxy functional additive may be formed from monoethylenically unsaturated monomers, with between about 2.5 and 30 weight percent bearing hydroxy functionality.

The long list of hydroxy functional monomers which may be employed in these hydroxy functional copolymers includes, but is not limited to, the following esters of acrylic or methacrylic acid and aliphatic alcohols: 2-hydroxyethyl acrylate; 3-chloro-2-hydroxypropyl acrylate; 2-hydroxy-1-methylethyl acrylate; 2-hydroxypropyl acrylate; 3-hydroxypropyl acrylate; 2,3 dihydroxypropyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 2-hydroxymethyl methacrylate; 3-chloro-2-hydroxypropyl methacrylate; 2-hydroxy-1-methylethyl methacrylate; 2-hydroxypropyl methacrylate; 3-hydroxypropyl methacrylate; 2,3 dihydroxypropyl methacrylate; 2-hydroxybutyl methacrylate; 4-hydroxybutyl methacrylate; 3,4 dihydroxybutyl methacrylate; 5-hydroxypentyl methacrylate; 6-hydroxyhexyl methacrylate; 1,3-dimethyl-3-hydroxybutyl methacrylate; 5,6 dihydroxyhexyl methacrylate; and 7-hydroxyheptyl methacrylate.

Although one of ordinary skill in the art will recognize that many different hydroxy bearing monomers including those listed above could be employed, the preferred hydroxy functional monomers for use in the hydroxy functional resin of the invention are $C_5$–$C_7$ hydroxy alkyl acrylates and/or $C_5$–$C_7$ hydroxy alkyl methacrylates, i.e., esters of $C_2$–$C_3$ dihydric alcohols and acrylic or methacrylic acids.

The remainder of the monomers forming the hydroxy functional copolymer, i.e., between about 90 and about 70 weight percent, are other monoethylenically unsaturated monomers. These monoethylenically unsaturated monomers, are preferably alpha, beta olefinically unsaturated monomers, i.e., monomers bearing olefinic unsaturation between the two carbon atoms in the alpha and beta positions with respect to the terminus of an aliphatic carbon to carbon chain.

Among the alpha-beta olefinically unsaturated monomers which may be employed are acrylates (meaning esters of either acrylic or methacrylic acids) as well as mixtures of acrylates and vinyl hydrocarbons. Preferably, in excess of 50 weight percent of the total of the copolymer monomers are esters of $C_1$–$C_{12}$ monohydric alcohols and acrylic or methacrylic acids, e.g., methylmethacrylate, ethylacrylate, butylacrylate, butylmethacrylate, hexylacrylate 2-ethylhexylacrylate, laurylmethacrylate, etc. Among the monovinyl hydrocarbons suitable for use in forming the copolymers are those containing 8 to 12 carbon atoms and including styrene, alpha methylstyrene, vinyl toluene, t-butylstyrene and chlorostyrene. When such monovinyl hydrocarbons are employed, they should constitute less than 50 weight percent of the copolymer. Other monomers such as vinyl chloride, acrylonitrile, methacrylonitrile, and vinyl acetate may be included in the copolymer as modifying monomers. However, when employed, these modifying monomers should constitute only between about 0 and about 30 weight percent of the monomers in the copolymer.

Other Materials

In addition to the above discussed components, other materials may be included in the high solids coating compositions of the invention. These include materials such as catalysts, antioxidants, U.V. absorbers, solvents, surface modifiers and wetting agents as well as pigments. The solvents used in the coating compositions of the invention are those which are commonly used. Typical solvents useful in the coating compositions facilitate spray application at high solids content and include toluene, xylene, methethyl ketone, acetone, 2-ethoxy-1-ethanol, 2-butoxy-1-ethanol, diacetone alcohol, tetrahydrofuran, ethylacetate, dimethylsuccinate, dimethylglutarate, dimethyladipate or mixtures thereof. The solvent in which the epoxy functional copolymer of the coating composition is prepared, may be employed as the solvent for the coating composition thus eliminating the need for drying the epoxy functional copolymer after preparation if such is desired. As mentioned above, the nonvolatile solids content of the high solids coating composition is at least 60 percent and preferably 70 percent or more, thus limiting the amount of solvent included in the composition.

Surface modifiers or wetting agents are common additives for liquid paint compositions. The exact mode of operation of these surface modifiers is not known, but it is thought that their presence contributes to better adhesion of the coating composition to the surface being coated and helps formation of thin coating on surfaces, particularly metal surfaces. These surface modifiers are exemplified by acrylic polymers containing 0.1-10 percent by weight of a copolymerized monoethylenically unsaturated carboxylic acids such as methacrylic acid, acrylic acid or itaconic acid, cellulose acetate butyrate, silicon oils or mixtures thereof. Of course, the choice of surface modifier or wetting agent is dependent upon the type of surface to be coated and selection of the same is clearly within the skill of the artisan.

The high solids coating composition of the invention also may include pigments. As noted above, the high solids composition of this invention are particularly useful when the coating composition includes metallic flake as a pigment. The rapid set and curing of the composition eliminates problems associated with redistribution of the metallic flake in the composition. The amount of pigment in the high solids coating composition may vary, but preferably is between 3 and about 45 weight percent based on the total weight of the paint composition. If the pigment is metallic flake, the amount ranges from about 1 to about 7 weight percent.

Application Techniques

The high solids coating composition can be applied by conventional methods known to those in the art. These methods include roller coating, spray coating, dipping or brushing and, of course, the particular application technique chosen will depend on the particular substrate to be coated and the environment in which the coating operation is to take place.

A particularly preferred technique for applying the high solids coating compositions, particularly when applying the same to automobiles as topcoats, is spray coating through the nozzle of a spray gun.

The invention will be further understood by referring to the following detailed examples. It should be understood that the specific examples are presented by way of illustration and not by way of limitation. Unless otherwise specified, all references to "parts" is intended to mean parts by weight.

EXAMPLE 1

(a) In a three-necked round bottom flask equipped with a stirrer dropping funnel and a thermometer are placed five hundred (500) grams of dry (dried over molecular sieves) 2-ethyl-1,3-hexanediol. Phosphorus pentoxide is added portionwise with continuous stirring and an exothermic reaction occurs. The addition of phosphorus pentoxide is regulated to maintain the temperature at 50° C. Test portions of the reaction mixture are withdrawn at short intervals of time and titrated with potassium hydroxide solution. The addition of $P_2O_5$ is continued until the acid equivalent weight reaches about 280. The reaction mixture is stirred at 50° C. for one more hour and then filtered. Its acid equivalent weight, by titration with KOH solution, is 271.

(b) A hydroxy acrylic copolymer is prepared from the following monomers:

|  | Wt/grams | Wt. % |
|---|---|---|
| Hydroxyethyl acrylate | 400 | 20 |
| Methylmethacrylate | 400 | 20 |
| Styrene | 200 | 10 |
| Butyl methacrylate | 1000 | 50 |

One hundred (100) grams tert-butyl perbenzoate is added to the above monomer mixture and the resulting solution added dropwise over a period of two hours to 1600 grams of refluxing (145°) methyl amyl ketone (under nitrogen). The heating and stirring is continued for half an hour after the addition is complete and then five (5) grams of tert-butyl perbenzoate are added portionwise to the reaction mixture. The reaction mixture is refluxed for an additional ninety minutes and then allowed to cool to room temperature. The molecular weight is determined by Gel Permeation Chromatography: $\overline{M}_n = 2540$, $\overline{M}_2/\overline{M}_n = 1.94$ Calculated $T_g = 27°$ C.
Theoretical solids = 60%
Determined solids = 59.2%
Viscosity, #4 Ford Cup = 44 Sec.
Hydroxy equivalent weight = 980

Eighty (80) parts of this polymer (b) are mixed with 20 parts of bis-(3,4-epoxy-6-methylcyclohexanemethyl) adipate (Araldite CY 178 from Ciba-Geigy) and 26 parts of hexamethyoxymethyl melamine (Cymel 301, American Cyanamid). The above mixture is dissolved in 12 parts of cellosolve acetate and a solution of 23.5 parts of hydroxyphosphate (a) in 15 parts of butyl acetate is added to it. The resulting mixture is stirred for one minute and then spray applied to primed panels in three coats with an intermediate flash of one minute and a final flash of five minutes. The panels are baked at 120° C. for 20 minutes to obtain clear coatings with excellent hardness, adhesion, gloss and solvent (methyl ethyl ketone and xylene) resistance.

EXAMPLE 2

Eighty (80) parts of acrylic copolymer solution described in Example 1(b) are mixed with 40 parts of Araldite CY 178 and 50 parts of Cymel 301. This mixture is dissolved in 30 parts of butyl acetate and 47 parts of hydroxy phosphate prepared in Example 1(a) are added to it. The resulting solution is stirred for one minute and then spray applied to primed steel panels. The panels are baked at 120° C. for 20 minutes to obtain hard clear coatings with excellent hardness, adhesion, gloss and solvent (xylene and methyl ethyl ketone) resistance. After 14 days in a Cleveland Humidity Chamber panels show no loss of gloss and no peeling, blistering or discoloration.

EXAMPLE 3

An acrylic copolymer is prepared from the following monomers:

|  | Parts by Weight |
| --- | --- |
| Butyl methacrylate | 26 |
| Ethylhexyl acrylate | 20 |
| Hydroxyethyl acrylate | 30 |
| Styrene | 24 |

The preparation is carried out in the same way as outlined in Example 1(b) by using cellusolve acetate as the solvent and tert-butyl peroctoate (5% of monomers) as initiator to obtain a 70% solution of the polymer. The calculated Tg is $-7°$ C. and the molecular weight of from Gel Permeation Chromatography is $M_n = 3070$ and $Mw/M_n = 2.2$.

Twenty (20) parts of the above polymer solution are mixed with 11.4 parts of Araldite CY 178, 15 parts of Cymel 301 and five parts of butyl acetate. 16.5 parts of hydroxy phosphate, described in Example 1(a), are added to the above solution and the resulting formulation spray applied to primed steel panels. The panels are baked at 120° C. for 25 minutes to obtain a coating with excellent gloss, hardness, adhesion and solvent (xylene and methyl ethyl ketone) resistance.

EXAMPLE 4

Ten parts of Acryloid OL-42 (Rohm & Haas Chem. Co.), 3.5 parts of Araldite CY-178, and y parts of Cymel 301 are dissolved in 4 parts of butyl acetate and 4.5 parts by weight of the hydroxy phosphate from Example 1(a) were added to the above solution. The mixture is shaken for one minute, drawn on a primed panel and baked at 110° C. for 25 minutes to obtain a clear coating with 93°/20° gloss and excellent xylene and methyl ethyl ketone resistance.

EXAMPLE 5

A coating is formulated as in Example 4 except that 3 parts of Araldite CY-179 are substituted for Araldite CY-178 and 6 parts of hydroxy phosphate from Example 1(a) are used. The solution is drawn on a primed panel and baked at 110° C. for 25 minutes to obtain a clear coating with excellent adhesion, gloss (90°/20°) and solvent resistance (xylene and methyl ethyl ketone).

EXAMPLE 6

Three hundred fifty (350) parts of $TiO_2$ are mixed with 350 parts of Acryloid OL-42 (Rohm & Haas Chem. Co.) and 25 parts of n-butyl acetate. The above mixture is taken up in a porcelain bottle containing porcelain beads and put on a roller mill for 16 hours. Thirty one (31) parts of this mill base are mixed with 10 parts of hydroxy ester Desmophen KL5-2330 (Rohm & Haas Chem. Co.), 5 parts of 1,4-butanediol diglycidyl ether and 16 parts of Cymel 301. In a separate flask 5 parts of Desmophen KL5-2330 are mixed with 13.6 parts of hydroxy phosphate (Example 1(a). The above two solutions are mixed together and the resulting formulation sprayed on primed panels in a four coat application (thickness 3.2–3.9 mil) with an intermediate flash of 1.25 minutes. After 5 minutes final flash the panels are baked at 90° C. for 28 minutes to obtain a glossy (95°/20°) coating with excellent xylene and methyl ethyl ketone resistance. The solids by weight are determined (130° C./30 min) to be 74%.

EXAMPLE 7

Five hundred (500) parts of $TiO_2$ and 250 parts of Ferrite yellow are mixed with 500 parts of Acryloid OL-42, 7.8 parts of dispersing agent BYK P 104S (Mellinckrodt) and 200 parts of n-butyl acetate; the mill base is prepared as described in Example 6.

(a) Thirty six (36) parts of the above mill base are mixed with 10 parts of 1,4-butanediol diglycidyl ether and 16 parts of Cymel 301.

(b) A fresh sample of hydroxy phosphate with an equivalent weight of 212 is prepared in accordance with Example 1(a). Eleven (11) parts of this phosphate are mixed with 5 parts of hydroxy ester Desmophen KL5-2330 (Rohm and Haas). Components (a) and (b) are mixed and the resulting formulation spray applied to primed panels in a three coat application and baked at 130° C. for 20 minutes to obtain yellow coatings with excellent gloss, adhesion, hardness and solvent (xylene and methyl ethyl ketone) resistance. Solids content by weight is 80%.

EXAMPLE 8

Fifty (50) parts of Phthalo Blue pigment are mixed with 500 parts of Acryloid OL-42 and 44 parts of n-butyl acetate and the mill base is ground as described in Example 6.

(a) Twenty five (25) parts of the above mill base are mixed with 29 parts of Acryloid OL-42, 15 parts of 1,4-butanediol diglycidyl ether, 35 parts of Cymel 301, 5 parts of aluminum flakes (65% in naphtha) and 10 parts of n-butyl acetate.

(b) Twenty (20) parts of Acryloid OL-42 are mixed with 17.1 parts of the hydroxy phosphate (eq. wt. 212) described in Example 7(b). Components (a) and (b) are mixed and the resulting formulation sprayed on primed panels in three coats with one minute flash times between coats. After seven minutes final flash the panels are baked at 130° C. for 20 minutes to obtain blue metallic coatings with excellent hardness, adhesion, and solvent resistance. The gloss is 63°/20° and the film thickness is 1.2–1.3 mil.

EXAMPLE 9

The paint is formulated as described in Example 8 except tht 20 parts of 1,4-butanediol diglycidyl ether are used in component (a) and 26.5 parts of hydroxy phosphate from Example 7(b) are used in component (b).

The paint is spray applied to primed test panels in two coats with a one minute intermediate flash. After seven minutes of final flash the panels are baked at 100° C. for 25 minutes. Adhesion, hardness and solvent resistance (xylene and methl ketone) is found to be excellent. Film thickness is 1.3–1.4 mil and gloss is 65°/20°. Solids content is found to be 73% by weight.

EXAMPLE 10

(a) Thirteen (13) parts of the mill base described in Example 8 are mixed with 9 parts of Acyloid OL-42, 9 parts of Epon 828 (Shell Chem. Co.), 14 parts of Cymel 301, 3 parts of aluminum flakes (65% in naphtha) and 8 parts of n-butyl acetate.

(b) Ten parts of the hydroxy phosphate (e.g. wt. 212) described in Example 7(b) are mixed with 10 parts of Acryloid OL-42. Components (a) and (b) are mixed together and spray applied in three coats to primed steel panels. The intermediate flash time is one minute and the final flash is seven minutes. The panels are baked at 50° C. for 10 minutes and then the temperature is raised from 50° C. to 100° C. over a period of 5 minutes. The gemperature is maintained at 100° C. for 15 minutes. The film thickness if 1.5–1.6 mil and gloss is 62°/20°. The coating has excellent hardness, adhesion and solvent (xylene and methyl ethyl ketone) resistance. Solids content is found to be 74% by weight.

EXAMPLE 11

(a) A solution of 1250 grams of 2-ethyl-1,3 hexane diol in 1250 grams of butyl acetate is placed under nitrogen in a three-necked round bottom flask equipped with a mechanical stirrer. Phosphoruspentoxide (442 grams) is added portionwise with continuous stirring; an exothermic reaction occurs and the addition of $P_2O_5$ is regulated to maintain the temperature between about 50° and about 60° C. After completing the addition (about 4 hours) the reaction mixture is stirred for three more hours. The acid equivalent weight, by titration with KOH solution, is found to be 315.

(b) Forty (40 parts of yellow mill based described in Example 7 are mixed with 10 parts of hydroxy ester PCP-0300 (Union Carbide), 10 parts of 1,4-butanediol diglycidyl ether and 17 parts of Cymel 301.

(c) 5 parts of hydroxy ester PCP-0300 (Union Carbide) are mixed with 31.2 parts of hydroxy phosphate from (a). Component (c) is added to component (b) and the mixture shaken for one minute. The paint is spray applied in three coats (1 min. flash time). After 7 minutes of final flash the coating is baked at 100° C. for 25 minutes. The film thickness is 2.2–2.5 mil and the gloss is 83°/20°. This coating has excellent hardness, adhesion and solvent resistance (xylene and methyl ether ketone). Solids content is found to be (30 min/140° C.) 80.5% by weight.

EXAMPLE 12

(a) Forty (40) parts of the yellow mill base described in Example 7 are mixed with 6 parts of Acryloid OL-42 (Rohm and Haas), 15 parts Cymel 301 and 10 parts of 1,4-butanediol diglycidyl ether.

(b) Five (5) parts of Acryloid OL-42 are mixed with 12 parts of the hydroxy phosphate described in Example 7(b). Components (a) and (b) are mixed well and the paint applied to steel panels in three spray coats. The panels are baked at 100° C. for 25 minutes to form a yellow coating with good gloss (76°/20°), adhesion, hardness and excellent solvent (xylene and methyl ethyl ketone) resistance. Film thickness is 2.1 to 2.2 mils. Mandrel bend does not show any cracks at all. The coating passed 100 in lbs. direct impact and 72 in lbs. reverse impact. A primed test panel when put in a Cleveland Hunidity Chamber shows no blistering, scribe creep, peeling or discoloration. The gloss is 56°/20° and the solids content of the formulation are found to be 79% by weight.

EXAMPLE 13

(a) Twenty five (25) parts of the mill base described in Example 8, 19 parts of Acryloid OL-42, 25 parts of Epon 828, 35 parts of Cymel 301 and 5 parts of aluminum flakes (65% in naphtha) are mixed with 25 parts by weight of n-butyl acetate. (b) Twenty parts of OL-42 are mixed with 27 parts of hydroxy phosphate (eq. wt. 212) described in Example 7(b). Component (a) is filtered and component (b) added to it. The mixture is shaken for thirty seconds and then spray applied to primed panels in three coats with one minute flash time between coats and seven minutes final flash. The paint is baked at 50° C. for 10 minutes and then at 100° C. for 20 minutes. The thickness of the film is found to be 1.5–1.7 mils. Xylene and methyl amyl ketone resistance is excellent.

EXAMPLE 14

(a) Twenty five (25) parts of blue mill base described in Example 8, 29 parts of Acryloid OL-42, 35 parts of Cymel 301, 25 parts of 1,4-butanediol diglycidyl ether and 5 parts of aluminum flakes (65% in naphtha) are mixed with 15 parts of n-butyl acetate.

(b) Thirty (30) parts of the hydroxy phosphate described in Example 7(b) are mixed with 20 parts of Acryloid OL-42.

The paint is applied and baked as described in Example 13. The film thickness is 1.4–1.6 mil. The coating has excellent solvent resistance (xylene and methyl ethyl ketone).

EXAMPLE 15

(a) Thirty (30) parts of Acryloid OL-42, 20 parts of Epon 828, forty (40) parts of Cymel 301, 4.2 parts of aluminum flakes (65% in naphtha) and 26.5 parts of n-butyl acetate are mixed in a plastic bottle.

(b) Ten (10) parts of Acryloid OL-42 and 22.6 parts of the hydroxy phosphate (eq. wt. 212) from Example 7(b) are dissolved in 5 parts of n-butyl acetate. Components (a) and (b) are mixed together and the resulting formulation spray applied in three coats to primed panels. The panels are baked at 100° C. for 25 minutes to obtain a hard, glossy silver metallic coating with excellent solvent resistance. The solids level of this formulation is 66% by weight.

EXAMPLE 16

In the paint formulation described in Example 7, 18 parts of hexabutoxymethyl melamine (Cymel 1156) are employed as the crosslinking agent. The paint is applied to steel test panels by spraying in three coats, baked at 130° C. for 20 minutes to obtain hard glossy coatings with excellent gloss, adhesion, hardness and solvent (xylene and methyl ethyl ketone) resistance.

EXAMPLE 17

The formulation described in Example 2 is repeated by employing 52 parts of ethoxymethoxy benzoguanamine (Cymel 1123) as the crosslinking agent. The formulation is applied by spraying to primed steel test panels and baked at 130° C. for 20 minutes to obtain hard, glossy coatings with excellent solvent (xylene and methyl ethyl ketone) resistance.

EXAMPLE 18

Twenty (20) parts of the polymer solution from Example 3 are mixed with 11.4 parts of Araldite Cy 178, 18 parts of butoxymethyl glycoluril (Cymel 1170), 2 parts of polypropyleneglycol (Pluracol P 710, BASF Wyandotte Chem.) and 5 parts of butyl acetate. To the above formulation, 16.85 parts of hydroxy phosphate described in Example 11(a), are added and the resulting formulation spray applied to primed steel panels. The panels are baked at 130° C. for 20 minutes to obtain coatings with excellent gloss, hardness, adhesion and solvent (xylene and methyl ethyl ketone) resistance.

EXAMPLE 19

Ten (10) parts of Acryloid OL-42 (Rohm & Haas Chem. Co.), 3.5 parts of Araldite CY178, 2 parts of bis-hydroxypropyl) azelate and 10 parts of butoxymethyl urea resin (Beetle 80, American Cynamid) are dissolved in 4 parts of butyl acetate. Hydroxy phosphate from Example 7(b), 3.5 parts is added to the above mixture and the resulting formulation drawn on steel test panels. The panels are baked at 130° C. for 20 minutes to obtain clear coatings with excellent hardness, gloss, adhesion and solvent (xylene and methyl ethyl ketone) resistance.

EXAMPLE 20

Ninety eight (98) grams of phosphoric acid and 50 mil of butyl acetate are placed in a round bottom flask fitted with a condenser and a dropping funnel and cooled with an ice-water mixture. Propylene oxide, 136 grams, is added dropwise with continuous stirring. The addition is complete in two hours.

Twenty eight (28) parts of the above hydroxy phosphate are substituted for the catalyst employed in Example 13. The resulting formulation is sprayed on primed steel test panels and baked at 120° C. for 20 minutes to obtain a blue metallic coating with excellent hardness, adhesion and solvent (xylene and methyl ethyl ketone) resistance.

EXAMPLE 21

Fifty (50) grams of 1,4-benzenedimethanol are dissolved in 150 grams of 2-ethyl-1,3-hexanediol and 40 ml of butyl acetate. Phosphorous pentoxide is added to the above solution as described in Example 1(a) to obtain a hydroxy phosphate with an acid equivalent weight of 364.

In the formulation described in Example 1, 31.5 parts of the hydroxy phosphate are substituted for the co-reactant catalyst used therein. The resulting formulation is sprayed on primed steel test panels and baked at 120° C. for 20 minutes to obtain glossy, hard coatings with excellent adhesion and solvent (xylene and methyl ethyl ketone) resistance.

EXAMPLE 22

One hundred (100) grams of 1,4-cyclohexanedimethanol are dissolved in 80 grams of butyl acetate at 50° C. and the procedure outlined in Example 1(a) followed to obtain a hydroxy phosphate with acid equivalent weight of 645.

Twenty (20) parts of the polymer solution from Example 3 are mixed with 11.6 parts of Araldite CY178, 18 parts of Cymel 301 and 5 parts of butyl acetate. The hydroxy phosphate described above, 34.7 parts, is added to the above solution and the resulting formulation applied by spraying to primed steel test panels. The panels are baked at 125° C. for 20 minutes to obtain a coating with excellent gloss, hardness, adhesion and solvent (xylene and methyl ethyl ketone) resistance.

In view of this disclosure, many modifications of this invention will be apparent to those skilled in the art. It is intended that all such modifications which fall within the true scope of this invention be included within the terms of the appended claims.

What is claimed is:

1. A thermosetting coating composition adapted for low temperature bake applications which contains greater than about 60% by weight of nonvolatile solids, and which, exclusive of pigments, solvents and other nonreactive components, consists essentially of:
   (A) a polyepoxide resin having a number average molecular weight ($\overline{M}_n$) of between about 140 and about 3,000;
   (B) a reactive catalyst comprising at least one organophosphate ester having the formula:

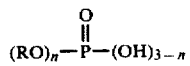

wherein n=1 to 2 and R is selected from the group consisting of mono or dihydroxy alkyl, cycloalkyl, or aryl radicals;
   (C) an amine-aldehyde crosslinking agent; and
   (D) up to about 45 weight percent based on the total weight of (A), (B), (C) and (D) of a hydroxy functional additive having a number average molecular weight ($\overline{M}_n$) of between about and about 6000, said organophosphate ester being included in said composition in an amount sufficient to provide between about 0.67 and about 1.4 equivalents of acid functionality for each equivalent of epoxy functionality on said polyepoxide resin, and said amine-aldehyde crosslinking agent being included in said composition in an amount sufficient to provide at least about 0.4 equivalents of nitrogen crosslinking functionality for each equivalent of hydroxy functionality included in said composition either as (i) an organic hydroxyl group on said organophosphate ester, (ii) a hydroxyl group on said hydroxy functional additive, or (iii) as a result of esterification of said epoxy functionality of said polyepoxide resin during cure of said coating composition.

2. A composition in accordance with claim 1 wherein said polyepoxide resin is selected from the group consisting of aliphatic, cycloaliphatic and aromatic polyepoxides having a number average molecular weight of between about 300 and about 2,000.

3. A composition in accordance with claim 1 wherein said hydroxy functional organophosphate ester is an ester wherein R is a mono or dihydroxy alkyl, cycloalkyl or aryl radical containing 3 to 10 carbon atoms.

4. A composition in accordance with claim 1 wherein said organophosphate ester is a monoester.

5. A composition in accordance with claim 1 wherein said organophosphate ester is a diester.

6. A composition in accordance with claim 1, wherein said organophosphate ester is a mixture of mono- and diesters.

7. A composition in accordance with claim 6 wherein said hydroxy functional organophosphate ester is an ester wherein R is a mono- or dihydroxy alkyl, cycloalkyl or aryl radical containing 3 to 10 carbon atoms.

8. A composition in accordance with claim 6 wherein at least a portion of said organophosphate esters are esters wherein R is mono- or dihydroxy alkyl radical containing 3 to 10 carbon atoms.

9. A composition in accordance with claim 1 wherein said reactive catalyst including said organophosphate ester is the reaction product of an excess of an alkyl, cycloalkyl or aryl diol or triol and phosphorus pentoxide.

10. A composition in accordance with claim 1 wherein said reactive catalyst including said hydroxy functional organophosphate ester is the reaction produce of an excess of an alkyl, cycloalkyl or aryl triol in which at least one of the hydroxyl groups is secondary and phosphorus pentoxide.

11. A composition in accordance with claim 1 wherein said reactive catalyst including said hydroxy functional organophosphate ester is the reaction product of an alkyl, cycloalkyl or aryl monoepoxide and phosphoric acid in a molar ratio of between about 1:1 and about 2:1.

12. A composition in accordance with claim 11 wherein said monoepoxide also bears hydroxyl functionality.

13. A composition in accordance with claim 11 wherein said monoepoxide is selected from monoepoxy esters, monoepoxy ethers and alkylene oxides.

14. A composition in accordance with claim 1 wherein said amine-aldehyde crosslinking agent is selected from the group consisting of condensation products of formaldehyde with melamine, substituted melamine, urea, benzoguanamine, and substituted benzoquanamine, and mixtures of said condensation products, and is included in an amount sufficient to provide between about 0.6 and about 2.1 equivalents of nitrogen crosslinking of functionality per equivalent of hydroxy functionality.

15. A composition in accordance with claim 1 wherein said hydroxy functional additive is selected from the group consisting of (i) hydroxy functional polyesters, (ii) hydroxy functional polyethers, (iii) hydroxy functional oligoesters, (iv) monomeric polyols, (v) hydroxy functional copolymers formed from monoethylenically unsaturated monomers, one or more of which bears hydroxy functionality and which is included in said copolymer in amounts ranging from about 10 to about 30 weight percent of said copolymer, and (vi) mixtures of (i)–(v).

16. A composition in accordance with claim 1 wherein said organophosphate ester is included in said composition in an amount sufficient to provide between about 1 and about 1.2 equivalents of acid functionality for each equivalent of epoxy functionality on said polyepoxide resin.

* * * * *